United States Patent [19]
Ward

[11] Patent Number: 5,823,350
[45] Date of Patent: Oct. 20, 1998

[54] PAPERBOARD SECURITY BATTERY PACKAGE

[75] Inventor: Thomas F. Ward, Madison, Wis.

[73] Assignee: Rayovac Corporation, Madison, Wis.

[21] Appl. No.: 55,203

[22] Filed: Apr. 3, 1998

Related U.S. Application Data

[60] Division of Ser. No. 773,216, Dec. 23, 1996, which is a continuation-in-part of Ser. No. 577,504, Dec. 22, 1995, Pat. No. 5,586,657.

[51] Int. Cl.⁶ ................................................... B65D 85/88
[52] U.S. Cl. ..................... 206/705; 206/459.1; 206/807; 340/572
[58] Field of Search ................................. 206/701, 703, 206/705, 459.1, 459.5, 461–463, 467, 470, 471, 807; 340/568, 571, 572

[56] References Cited

U.S. PATENT DOCUMENTS

| | | |
|---|---|---|
| 1,837,012 | 4/1931 | Boeye . |
| 2,081,656 | 4/1937 | Anthony . |
| 2,385,400 | 2/1945 | Briggs . |
| 3,276,574 | 10/1966 | Meyers . |
| 3,480,138 | 11/1969 | Baker . |
| 3,985,232 | 10/1976 | Johnson . |
| 3,990,578 | 11/1976 | Roeser . |
| 4,355,758 | 10/1982 | Lavery . |
| 4,688,026 | 8/1987 | Scribner et al. . |
| 4,696,402 | 9/1987 | Harmon et al. . |
| 4,745,401 | 5/1988 | Montean . |
| 4,769,631 | 9/1988 | Copeland . |
| 4,848,568 | 7/1989 | Eckelman . |
| 5,005,125 | 4/1991 | Farrar et al. . |
| 5,117,976 | 6/1992 | Whitt et al. ............................. 206/704 |
| 5,143,215 | 9/1992 | Hartley et al. . |
| 5,311,989 | 5/1994 | Ward et al. ............................. 206/705 |
| 5,379,894 | 1/1995 | Haas et al. . |
| 5,586,657 | 12/1996 | Ward et al. . |
| 5,590,787 | 1/1997 | Hodges . |
| 5,617,812 | 4/1997 | Balderson et al. . |
| 5,621,387 | 4/1997 | Phillips et al. ......................... 206/701 |

FOREIGN PATENT DOCUMENTS

| | | |
|---|---|---|
| 0541983 A1 | 10/1992 | European Pat. Off. . |
| 92 03 119.6 | 10/1992 | Germany . |

OTHER PUBLICATIONS

Varta Battery Package, identified as "Exhibit E".

*Primary Examiner*—Paul T. Sewell
*Assistant Examiner*—Luan K. Bui
*Attorney, Agent, or Firm*—Lathrop & Clark

[57] ABSTRACT

Batteries are displayed for consumer purchase in a package which provides a means for spacing an electronic article surveillance sensor from the batteries contained within the package. By spacing the sensor away from the metal case of the batteries the interference typically caused by metal in close proximately to an electronic article surveillance sensor is eliminated. Two ways of accomplishing the spacing of the sensor from the batteries are disclosed. The first is a strip of cardboard placed between the surveillance sensor mounted on the side of the box and the batteries. The second is a specially designed box which has a box panel which divides the box into two compartments: one to hold the batteries and a second which creates a space between the batteries and the side of the box on which a surveillance sensor is mounted.

5 Claims, 5 Drawing Sheets

PAPERBOARD SECURITY BATTERY PACKAGE

RELATED APPLICATIONS

This application is a divisional of U.S. application Ser. No. 08/773,216, filed Dec. 23, 1996, which was a continuation-in-part of application Ser. No. 08/577,504, now U.S. Pat. No. 5,586,657 the disclosures of which are incorporated by reference herein.

FIELD OF THE INVENTION

The present invention relates to battery packaging in general and to battery packaging incorporating electronic article surveillance systems in particular.

BACKGROUND OF THE INVENTION

Crimes related to retail establishments represent a serious source of loss to retailers. Although a tremendous number of shoplifters are apprehended each year, it is believed that reported occurrences of shoplifting are dwarfed by the number of undetected or unreported shoplifting events occurring each year in the United States. The cost of shoplifting is not only a significant cost for retailers, but is ultimately borne by the consumer.

Arrayed against the growth in theft is technology which has provided solutions which increase the cost or risk to the criminal perpetrators by making the perpetration of their crimes more readily detectable.

One approach to detecting shoplifting is to place an electronic article surveillance sensor which is hidden or difficult to remove on each item of merchandise. The sensors are detected at the exits of a store and assure that merchandise cannot be removed unless the merchandise is first purchased. Examples of some of the sensors which have been developed are found in U.S. Pat. Nos. 5,357,240; 5,313,192; 5,111,186; 4,510,489; and 4,510,490. For patents to related technology see U.S. Pat. Nos. 5,341,125; 5,109,217; and 4,980,670.

While it is generally desirable that the prospective thief be aware of the fact that a particular store is protected by an electronic article surveillance system, it is also desirable that the potential thief not be able to readily remove the sensor from the merchandise. In some applications this is accomplished by placing a lock on the merchandise which cannot be removed without a special key. For other types of merchandise, it is desirable that the sensor be of the disposable type which is integrally packaged with the goods. In this type of sensor it is usually desirable to hide the sensor so its location and even existence within a particular product is not readily apparent to the potential thief.

In order to cost-justify itself, the electronic surveillance sensor must be cost effectively incorporated in the packaging so the cost of preventing theft does not exceed the cost incurred by theft. Thus, as in the production of all consumer items, cost efficient manufacture is a critical objective.

With batteries there is a problems with placing the sensor in the package. If placed too close to the batteries the sensor may not be detectable. The weight of the batteries can also crush the sensor if the package is dropped in shipping.

What is needed is a battery package which hides an electronic surveillance sensor in the package while preserving functionality.

SUMMARY OF THE INVENTION

The battery package of this invention is a consumer display package which provides a means for spacing an electronic article surveillance sensor from the batteries contained within the package. By spacing the sensor away from the metal case of the batteries the interference typically caused by metal in close proximately to an electronic article surveillance sensor is eliminated. Several ways of accomplishing the spacing of the sensor from the batteries are disclosed. The first means for spacing is a strip of corrugated paperboard or "cardboard" placed between the batteries and one side of the battery package. The surveillance sensor is placed on the inside of the box and the cardboard is inserted between the sensor and the batteries. An alternative means for spacing a surveillance sensor is a specially designed box which has a box panel which divides the box into two compartments—one to hold the batteries and a second which creates a space between the batteries and a side of the box on which a surveillance sensor is mounted.

It is an object of the present invention to provide a package for batteries suitable for mounting a hidden surveillance sensor within the package.

It is a further object of the present invention to provide a package which improves the functionality of an electronic article surveillance sensor.

Further objects, features and advantages of the invention will be apparent from the following detailed description when taken in conjunction with the accompanying drawings.

DESCRIPTION OF THE PREFERRED EMBODIMENT

Figure 1:
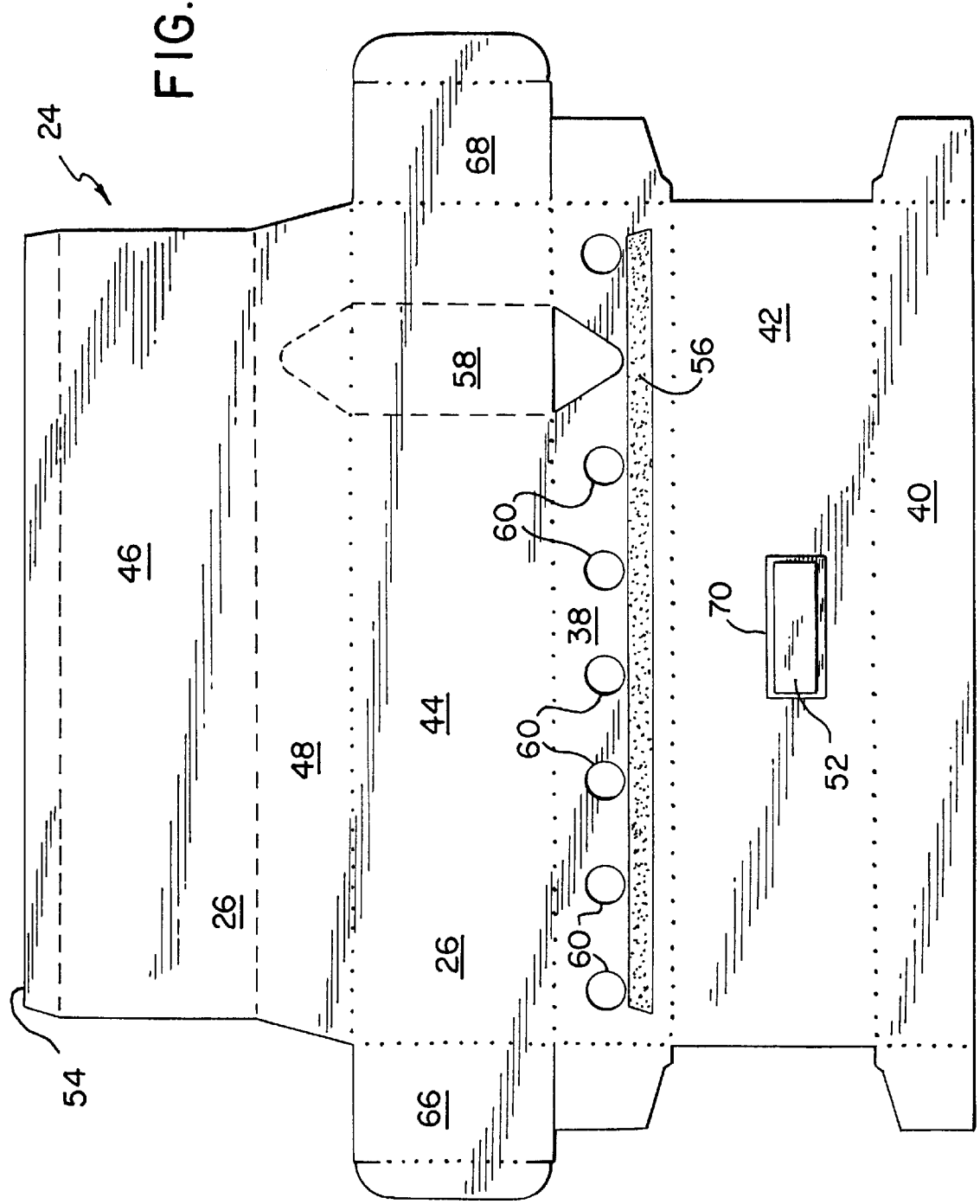
FIG. 1 is a plan view of the blank from which the package of this invention is made.
Figure 2:
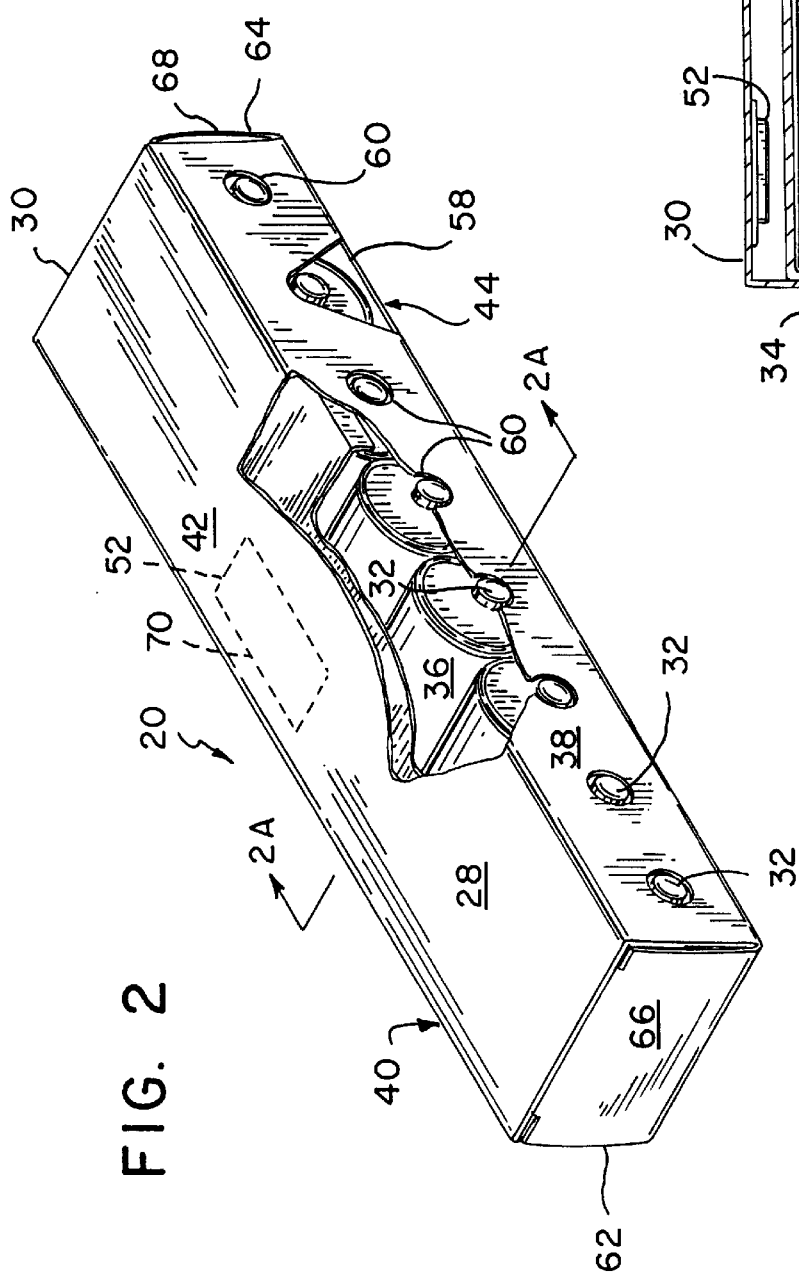
FIG. 2 is a partially cutaway isometric view of the assembled battery package of FIG. 1.

Referring to FIGS. 1–6, wherein like numbers refer to similar parts, a battery package 20 containing batteries 22 is shown in FIG. 2. The package 20 is constructed from a stiff paperboard blank 24, as shown in FIG. 1. The blank 24 has an inside surface 26 shown uppermost in FIG. 1. The outside surface 28 of the blank, shown in FIG. 2, may have indicia printed thereon to inform the consumer about the contents and source of the package 20. The package 20 has the shape of a rectangular box 30 and contains an array of batteries 22. The array is one battery wide and eight batteries long. The batteries have positive ends 32 and negative ends 34, joined by cylindrical sides 36. The sides 36 of adjacent batteries 22 touch.

Figure 2A:
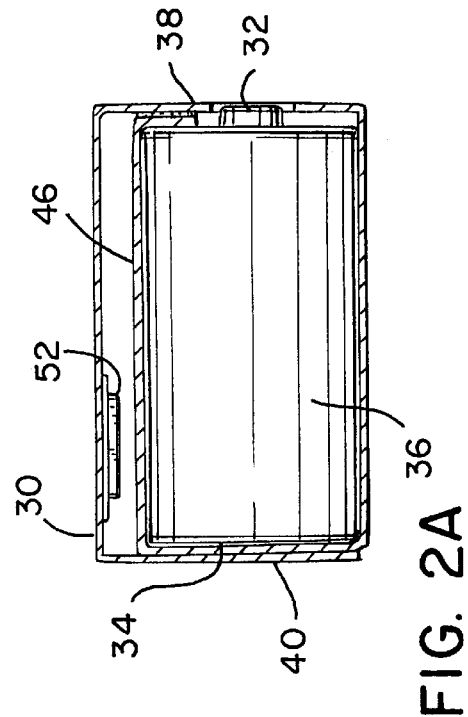
FIG. 2A is a cross-sectional view of the battery package of FIG. 2 taken along section line 2A—2A.

The blank 24 is folded to form the rectangular box 30, as shown in FIG. 2. The blank 24 has a top panel 38 and a bottom panel 40 joined by a back side panel 42. The top panel 38 defines the width of the box 30. The back side panel 42 together with the front side panel 44 defines the height of the box 30. An interior panel 46 is joined to the front side panel 44 by an overlapping bottom panel 48. The interior panel 46 in the folded box 30 shown in FIG. 2 is assembled to lie in spaced parallel relation to the back panel 42. This interior panel 46 and the front panel 44 closely engage the batteries 22. As shown in FIG. 2A, this spacing of the interior panel 46 from the back panel creates a gap 50 between the back panel 42 and the batteries 22 of approximately 1/10 to 1/5 of an inch with the electronic article surveillance sensor 52 positioned therein. This gap 50 allows an electronic article surveillance sensor 52 attached to the back side panel 42 to properly function.

The interior panel 46 is held in spaced relation to the back panel 42 by a glue tab 54 which attaches to a glue strip 56 along the back side of the top panel 38.

The box 30 is provided with a conventional punch out tab 58 which allows the removal of individual batteries from the package 20. Holes 60 along the top side panel 38 allow the consumer to confirm that the correct number of batteries is contained in the package and, unlike conventional boxes, the holes are offset towards the front side 44. The box 30 is closed at the ends 62, 64 by closure panels 66, 68 respectively.

The surveillance sensor 52 when in the activated condition triggers an alarm if the article to which the sensor is attached passes near detectors (not shown) placed at the exits of a store. In order to properly be detected the sensor must be spaced from any metal object. Thus batteries pose a problem with the placement of a surveillance sensor. An example of an effective package for a batteries including a sensor is disclosed in U.S. Pat. No. 5,586,657, the disclosure of which is incorporated by reference herein. The box 30 with the interior panel 46 allows the surveillance sensor 52 to be hidden within the box 30 and at the same time spaced from the metal surfaces 36 of the batteries. The sensor 52, depending on type, may function best if oriented with its long side 70 extending transverse to the vertical sides 36 of the batteries 22. The sensor 52 being thus disposed with its long axis perpendicular to the long axis of the batteries, will on average be further away from the metal of the cylindrical batteries than if it were disposed with its long axis parallel to the battery axes.

The box 30 has a height measured between the top panel 38, and a bottom panel 40. The top panel 38 and the bottom panel 40 are joined by the first side panel 42 and the second side panel 44, the width of the top panel and bottom panel defining the width between the first and second sides 42, 44. A plurality of identical batteries 22 are arranged adjacent to each other within the box 30 in a rectangular array having a width of one battery. The batteries are identically arranged so as to define the width of the array, the batteries being arranged so the sides of adjacent batteries touch. The top width and the box bottom width are approximately one-tenth to approximately one-fifth of an inch greater than the width of the battery array.

An exemplary sensor is the Ultra Max label manufactured by Sensormatic Electronics Corporation of 500 Northwest 12th Avenue, Deerfield Beach, Fla. 33442. The sensor 52 contains a thin film of magnetostrictive ferromagnetic material which is spaced from a second hard ferromagnetic metal plate. The magnetostrictive material is magnetically biased and thus armed by the hard ferromagnetic metal plate to mechanically resonate at a pre-selected frequency. Near each exit of a store an interrogation coil sweeps through a frequency range which includes the frequency at which the magnetic sensor will be induced to resonate, that is to vibrate. When the magnetostrictive material vibrates, a detector connected to a receiving coil detects a change in coupling between the interrogation coil and the receiving coil and sets off an alarm. In a preferred embodiment the sensor 52 is adhesively bonded to the side panel 42.

When a consumer takes a product to the check-out counter a de-activation device changes the magnetization of the second hard ferromagnetic metal plate which changes the frequency at which the magnetic sensor will be induced to resonate. Thus the product may be removed from the store without triggering the detector.

Figure 3:
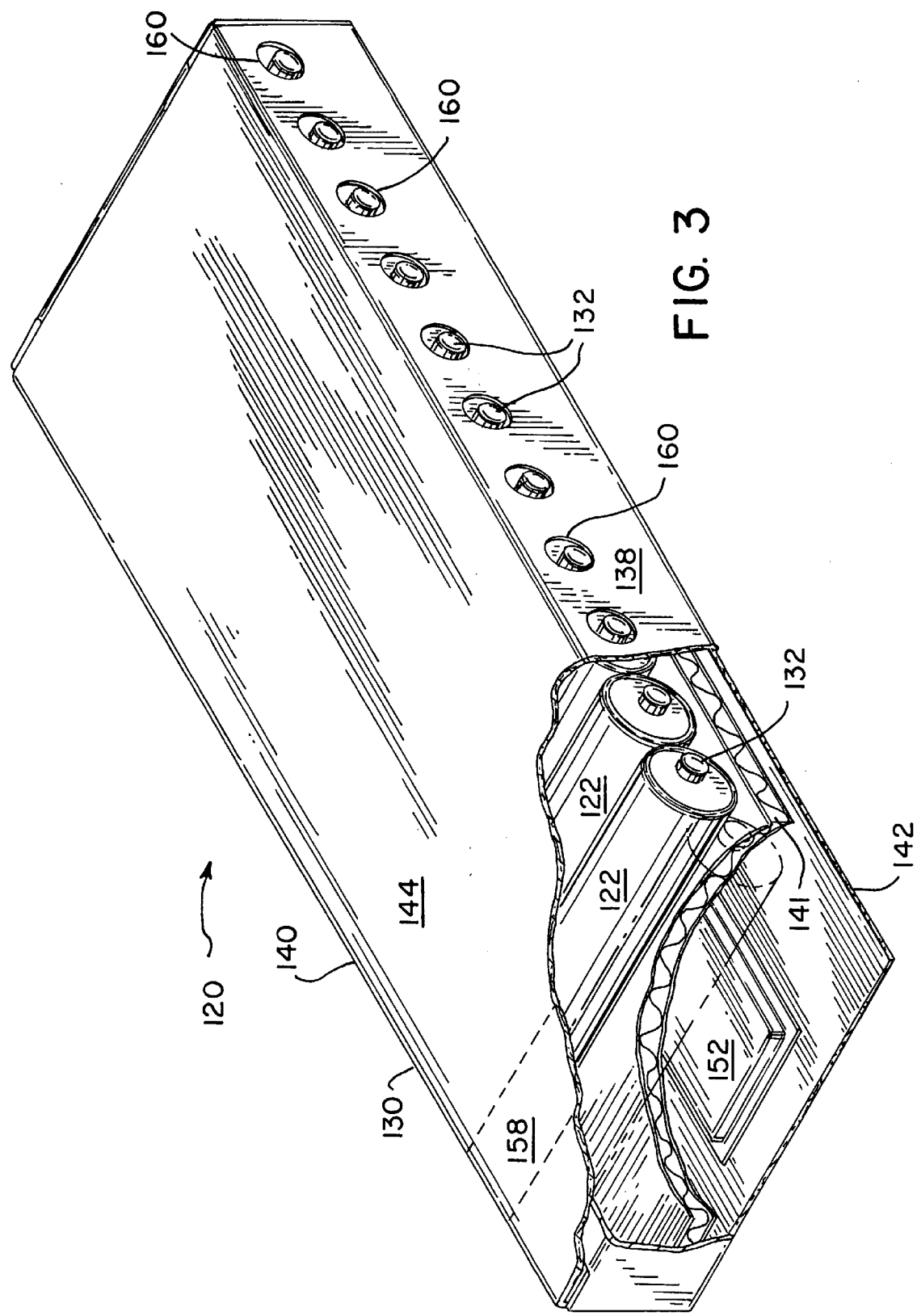
FIG. 3 is a partially cutaway isometric view of an alternative embodiment of the battery package of this invention.

An alternative battery package 120 is shown in FIG. 3. The package is a rectangular box 130 which has a first side panel 142 and a second side panel 144. The package 120 is sized to hold AAA batteries 122. The top panel 138 overlies the positive terminals 132 of the batteries 122 and joins the two side panels 142, 144. A bottom panel 140 joins the first and second side panels 142, 144. The box 130 is constructed with a width sufficiently greater than the width of the batteries 122 so that space is available for a rectangular spacer of corrugated cardboard 141. The corrugated cardboard spacer 141 creates a gap between the batteries 122 and a sensor 152 which is adhesively attached to the first side 142.

The box 130 has the conventional features of a punch-out tab 158 for removal of batteries 122 from the box 130. Also the box 130 has holes 160 which are arrayed along the top of the box 130 to facilitate the consumer's inventorying the contents of the box 130. Unlike a conventional box the holes are not centered between the first and second sides 142, 144. Tests of sensor placement within test boxes has shown the importance, at least for some sensors, of employing corrugated cardboard as opposed to other materials which were tried and found to interfere with the proper functioning of the sensor. The width of the corrugated spacer 141 will typically be 1/10 to 1/5 of an inch in thickness. The corrugated spacer is positioned by the panels of the box 130, and need not be adhesively attached.

Figure 5:
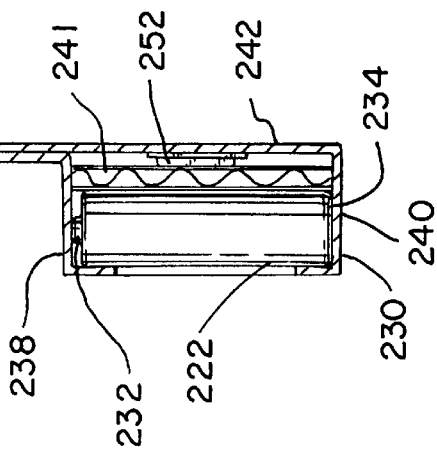
FIG. 5 is a cross-sectional view of the battery package of FIG. 4 taken along section line 5—5.
Figure 4:
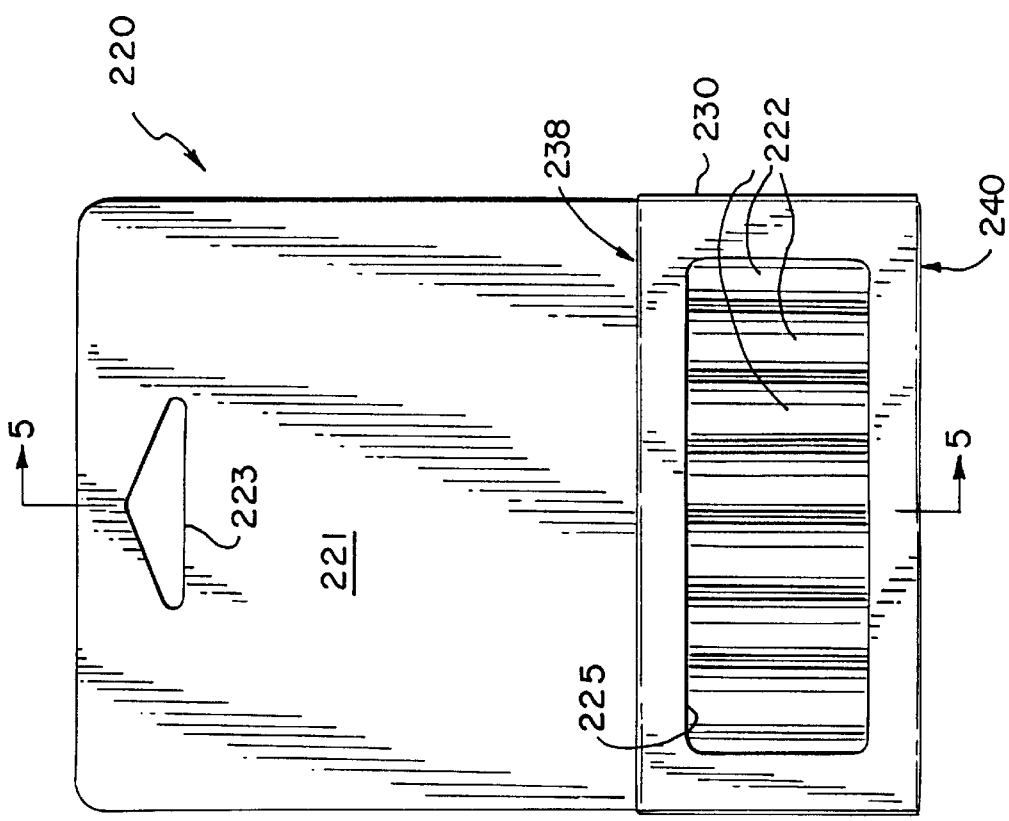
FIG. 4 is a front elevational view of a further alternative embodiment battery package of this invention.

Yet another battery package 220 is shown in FIGS. 4 and 5. This package 220 incorporates a display card 221 with a mounting hole 223. The package 220 has a window 225 through which batteries 222 can be viewed. A piece of corrugated cardboard 241 positioned behind the batteries 222 spaces the batteries from the back panel 242 of the box 230 which contains the batteries 222. Adhesively fastened to the inside of the back panel 242 of the box is a surveillance sensor 252. Over lying the positive ends 232 of the batteries 222 is a top panel 238, and underlying the negative ends 234 of the batteries 222 is a bottom panel 240. The width of the top panel 238 and the bottom panel 240 is greater then the width of the batteries 222 contained in the package 220. This greater width of the box 230 accommodates the cardboard insert 241 and the sensor 252.

Figure 6:
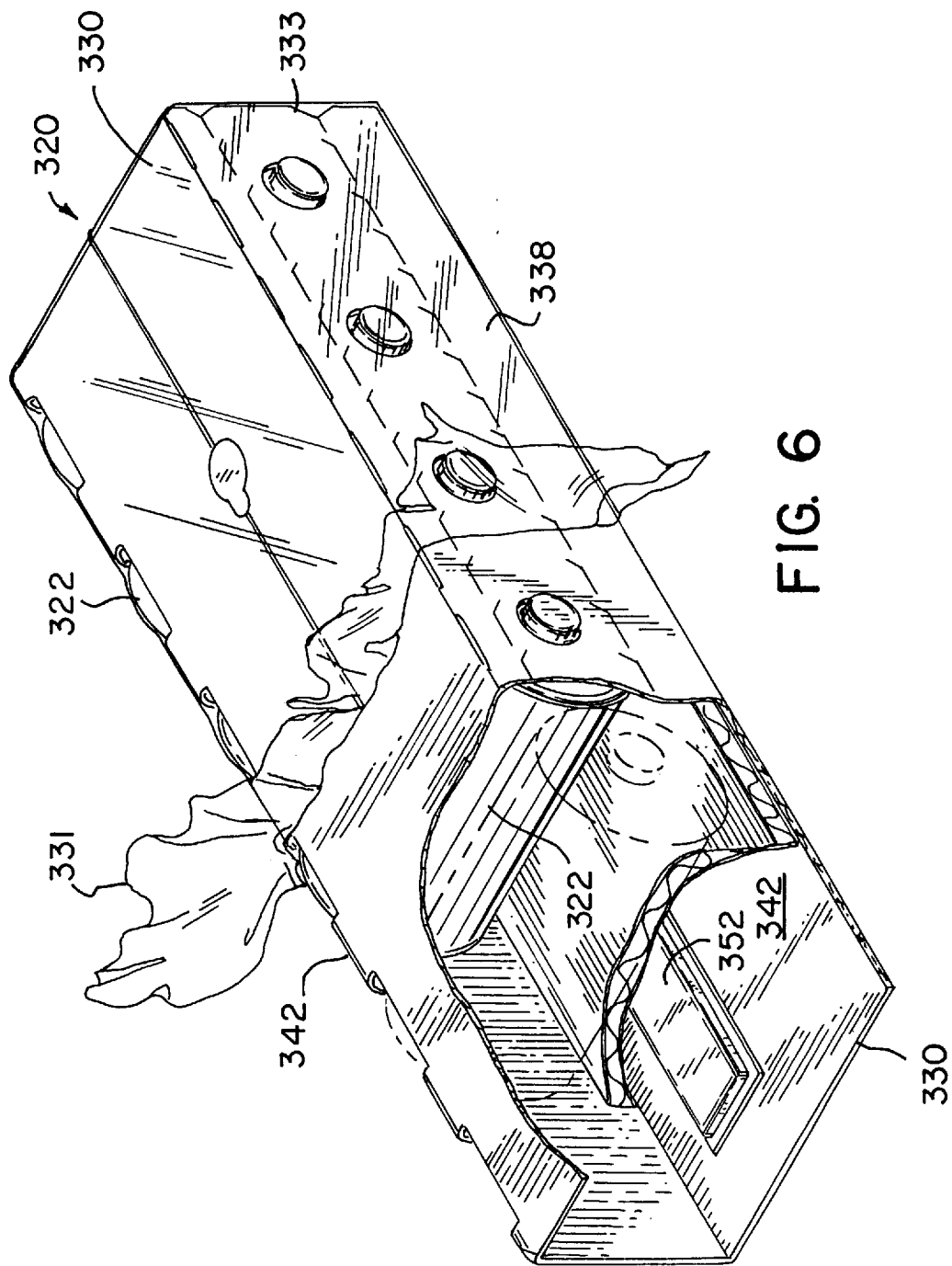
FIG. 6 is an isometric view of another alternative embodiment of the battery package of this invention.

Still another battery package 320 is shown in FIG. 6. The battery package is an opened ended rectangular tube 330. The tube 330 is wrapped with plastic film 331 and has a tear tab 333 along the top of the package for gaining access to the batteries 322. The top panel 338 and the bottom panel 340 are wider than the width of the batteries 322 so that a rectangular cardboard spacer 341 can be placed between the batteries and the back panel 342. A surveillance sensor 352 is adhesively attached to the back panel 342 and is spaced from the batteries by the cardboard spacer 341.

It should be understood that the invention embodiments disclosed in FIGS. 1–6 are similar in that the top and bottom of the battery box are wider than the width of the batteries contained within the box thus leaving room for a space created by a corrugated cardboard insert or an inner panel of the box. The space is created between the side of the box and the batteries and allows a surveillance sensor to be placed interior to the box and remain spaced from the batteries and their metal cases, this spacing allowing the sensor to properly function.

It should be understood that sensors of types other than the one illustrated and described could be used in the battery package 20.

It should also be understood that other battery types for example AA, AAA, AAAA, C, D, or 9-volt batteries, could be packaged in containers similar to the battery package 20, 120, 220 or 320.

It is understood that the invention is not limited to the particular construction and arrangement of parts herein illustrated and described, but embraces such modified forms thereof as come within the scope of the following claims.

I claim:

1. A consumer display package containing a plurality of batteries, the package comprising:

a paperboard blank having a first side panel, a top panel which extends from the first side panel, and a bottom panel which extends from the side panel beneath the top panel, and a second side panel which extends between the bottom panel and the top panel, the blank being folded and connected together to define a box in which the first side panel is spaced in parallel relation from the second side panel a first distance;

a plurality of like batteries, the batteries having tops and bottoms joined by sides, wherein the batteries are positioned within the box, and the battery tops are adjacent to the top panel, and the battery bottoms are adjacent to the bottom panel, the batteries having a first thickness in the direction between the first side panel and the second side panel, the first thickness being less than the first distance;

an electronic article surveillance sensor mounted on the first side panel such that the sensor is not visible when the package is fully loaded with batteries, the sensor being positioned between the first panel and the second panel;

a sheet of paperboard material interposed between the first side panel and the batteries within the box, the sheet serving to enforce non-engagement between the sensor and the batteries, to thereby allow the surveillance sensor to properly function.

2. The consumer display package of claim 1 wherein the first thickness is less than the first distance by an amount of between about ⅕ inch and ⅒ inch.

3. The consumer display package of claim 1 wherein the sheet of paperboard material is fixed to the top panel and to the bottom panel, to define a panel within the package which spaces the batteries from the first panel.

4. The consumer display package of claim 1 wherein the sheet of paperboard material is corrugated paperboard which is loosely positioned between the batteries and the first panel to serve as a spacer therebetween.

5. The consumer display package of claim 1 further comprising a portion of the blank which extends upwardly from the assembled box to define a package card.

* * * * *